United States Patent [19]

Stanton

[11] Patent Number: 4,629,483
[45] Date of Patent: Dec. 16, 1986

[54] CERAMIC FILTER WITH PLURAL LAYERS OF DIFFERENT POROSITY

[75] Inventor: Robert J. Stanton, Walworth, N.Y.

[73] Assignee: Refractron Corp., Newark, N.Y.

[21] Appl. No.: 816,523

[22] Filed: Jan. 6, 1986

[51] Int. Cl.$^4$ ............................................. B01D 39/06
[52] U.S. Cl. ...................................... 55/487; 55/523; 55/DIG. 30
[58] Field of Search .......................... 55/523, 486–488, 55/498, 500, 512–514, DIG. 30

[56] References Cited

U.S. PATENT DOCUMENTS

| 3,182,803 | 5/1965 | Chisholm | .............................. 55/512 |
| 4,133,657 | 1/1979 | Krogsrud . | |
| 4,251,239 | 2/1981 | Clyde et al. . | |
| 4,407,967 | 10/1983 | Luks . | |
| 4,436,538 | 3/1984 | Tomita et al. . | |

FOREIGN PATENT DOCUMENTS 309965  7/1971  U.S.S.R. ................................. 55/487

OTHER PUBLICATIONS

Refractron Corp., Ceramic Porous Media Product Data, Aug. 1985.

Primary Examiner—Bernard Nozick
Attorney, Agent, or Firm—Martin Lukacher

[57] ABSTRACT

A monolithic, layered, tubular ceramic filter structure with clearly defined layers of different permeabilities and porosities formed by compressing plastic masses of ceramic materials of selected particle size with binders to form the substrate layer with the desired, typically more open structure, and then compressing the substrate layer and subsequent layers of selected, typically less open structure in successive compression steps to form a composite body, and then firing the composite body to form a ceramically monolithic porous body with controlled uniform pressure drop and particle size retention characteristics across its entire surface.

11 Claims, 2 Drawing Figures

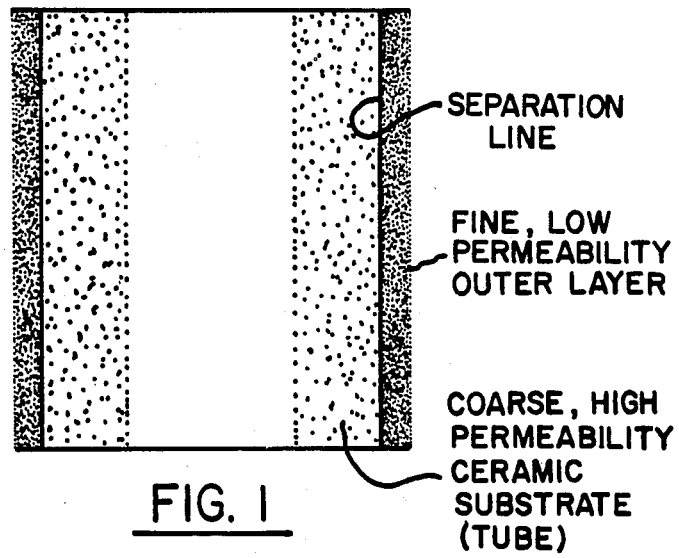
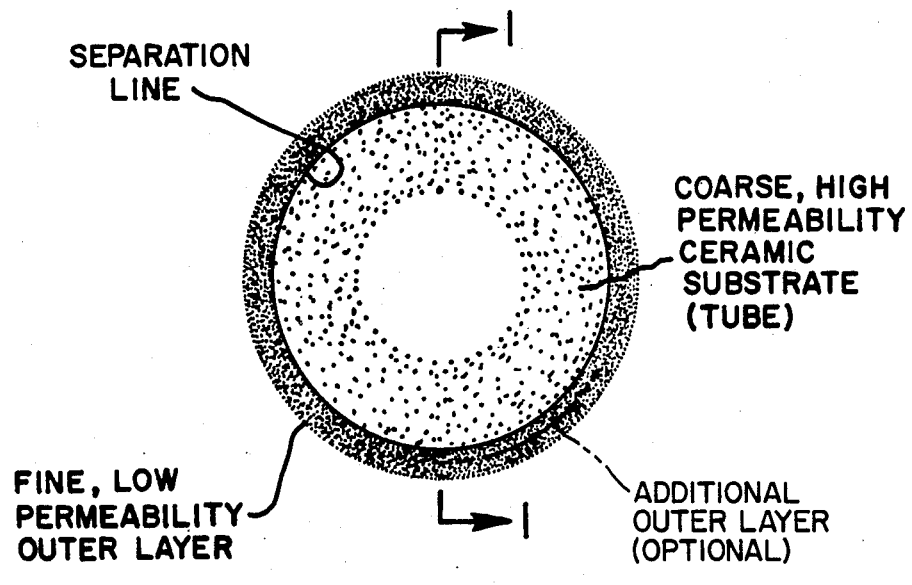

CERAMIC FILTER WITH PLURAL LAYERS OF DIFFERENT POROSITY

DESCRIPTION

This invention relates to ceramic filters and particularly to a ceramic filter which may be tubular in shape and is a monolithic body of plural layers, which, in cross-section, define distinct lines of separation between the layers; the layers being a substrate layer and more or less porous surface layer or layers.

The invention is especially suitable for use for high temperature applications, such as for the filtration of industrial process gases and high temperature combustion gases to remove particulate matter from such gases. For example, the filters provided by the invention may be applied to the removal of ash particles from gasified coal thereby providing product gas which can be used directly since the coal fines (dust) are removed therefrom in the filter. The filters provided by the invention may also be used for ambient temperature filtration applications in gas and fluid environments, for bubble diffusion applications and, also wherever ceramic units are needed.

The filters provided by the invention may have an outer layer, less permeable and porous, than the inner layer or layers thereof which trap and filter out material to be separated from the gas. The outer layers, because of their small pore size and permeability, reduce the depth of penetration of the filtrate particles and can prevent any significant penetration into the inner or substrate layer of the filter. The filter can then be cleaned by efficient back pressure or pulse cleaning.

Ceramic filters in plate and tubular form and of different porosities have been available, for example from the Refractron Corporation of Newark, N.Y. The porosity desired is obtained by utilizing the particles of ceramic material, for example, crushed fused crystaline aluminum oxide, of grain or particle size which is appropriate to produce the required pore size structure of the resulting media. A plastic mass obtained by mixing the ceramic particles with ceramic bonding material is compressed isostatically or in a hydraulic press or jolter to the required shape. By isostatic compression is meant the application of uniform pressure as by molding with the aid of a expansible bag. The plastic mass may be placed upon a mandrel, if a tubular structure is desired. The mass is confined within a cylindrical casing, between the expansible bag and the mandrel. Pressurized fluid is then applied to the bag to form the plastic mass into a tubular body on the mandrel.

In order to provide different permeabilities in a ceramic filter system and to enable cleaning of trapped particles, separate tubes have been used which have been disposed concentrically, with space there-between to provide internal passageways. Separate supports for the tubes are needed during operation and while backwashing or cleaning (see U.S. Pat. No. 4,251,239, issued Feb. 17, 1981 and U.S. Pat. No. 4,133,657, issued Jan. 9, 1979).

Other attempts to obtain different porosities which vary throughout a filter element, rather than in distinct layers, have involved the use of polyurethane foam of differing porosities and special ceramic media (e.g. sponge forming). (See U.S. Pat. No. 4,436,538, issued Mar. 13, 1984 and the above-referenced U.S. Pat. No. 4,251,239). It has also been suggested to provide a ceramic body of varying porosity by adding particles to pre-fired bodies of ceramic material (see U.S. Pat. No. 4,407,967, issued Oct. 4, 1983). A monolithic, layered structure wherein the layers have specific discrete porosity and permeability has not, thereby, been obtained. The application of additional ceramic materials to a pre-fired body may be viewed as the application of a pre-coat upon the body to decrease the functional external pore size to attempt to minimize the depth of particle penetration and provide a more effective trap for the particulates which are to be filtered. It has not been feasible to provide a uniform pre-coat. Thus, cleaning by reversing the flow through the filter (pulse cleaning) does not uniformly remove the particulate matter and render the filter fully effective again (unclogged).

It is therefore the principal object of the present invention to provide an improved ceramic filter in the form of a monolithic body having a plurality of layers of different porosity which is suitable for cleaning by periodic reverse purging by a fluid or gas.

A further object of the present invention is to provide an improved ceramic filter which may be applicable to other industrial applications such as fine bubble diffusion applications by virtue of plural layers of different porosity which yield ultrafine bubbles with reduced operating pressure requirements.

It is a still further object of the present invention to provide an improved ceramic filter of tubular shape having plural layers with the inner layer of greater porosity than the outer layer, with filtration or diffusion characteristics defined by the outer layer while mechanical strength and thermal shock resistance may be controlled by the substrate layer.

Briefly described, a ceramic filter embodying the invention comprises a substrate layer of ceramic material of a first porosity and a second layer of ceramic material of a second porosity different from the first porosity. The layers are tubular with the substrate layer having higher porosity (made up of coarser particles of ceramic material) than the outer layer or layers. The layers define a monolithic structure having in cross-section a distinct line separating the layers in that the structure is formed by compressing a first plastic mass of ceramic particles of a first particle size and binder material to form the substrate layer, which then may be mechanically trimmed, by lathe or otherwise, to its desired shape and thickness; and then applying and compressing together with the formed substrate layer, a second plastic mass of ceramic particles of a second particle size. The compression is preferably carried out isostatically, using a mandrel on which the substrate layer is compressed and which remains in place when the second and subsequent layers are compressed to form the composite body. The composite body (after forming to the desired peripheral surface shape and removal of the mandrel), is fired. In other words, the layers are distinctly formed while in the "green" state and then fired. This provides for distinct, controlled layers which are separated by distinct lines. Only after the layers are formed in the green state is the composite structure fired. The filter unit typically uses ceramic particles of finer (less coarse) size in the mass which provides the outer layers. For some applications (inside to outside flow) the substrate could be formed on the outside of the structure. The discrete outer layers trap the filtrate particles, and the particles are uniformly trapped therein. The particles may readily be removed by reverse air or fluid blasts.

The foregoing and other objects, features and advantages of the invention as well as a presently preferred embodiment thereof and the best mode now known for the practice thereof will become more apparent from the reading of the following description in connection with the accompanying drawings, wherein:

FIG. 1 is a sectional view (the section being taken along the line 1—1 in FIG. 2) of a ceramic filter embodying the invention; and FIG. 2 is a top view of the filter shown in FIG. 1.

Referring to the drawings, it will be observed that the ceramic filter has a coarse, high-permeability ceramic substrate layer which is tubular, and a finer, lower permeability outer layer. There is a distinct line which appears in the cross-section separating the layers. The outer layer is uniform and its permeability and sizes of pores is determined by the particle size of the ceramic materials used. While a filter having two layers is shown, more than two layers can be used. Any additional outer layers are formed in the same way as the outer, fine low-permeability layer shown in the drawing. Each outer layer preferably has a lower permeability. The layers are separated by separation lines which are distinct.

The filter is characterized by the manner in which it is made. Initially for each of the layers a suitable mix of ceramic particles which are refractory and ceramic binding material is made. The particle size is selected to yield the porosity or permeability required. The refractory ceramic media may be aluminum oxide, silicon carbide, mullite, alumina, zirconia or other appropriate refractory grain or combination thereof. The ceramic bonding material may be any of the bonds and bonding systems conventional in the art. These are referred to as green binder systems, and may for example be any of the silicate, dextrin, phosphate, or other conventional binding systems.

An isostatic compression device, such as used heretofore in forming ceramic tubes and shapes may be used. In the formation of a tubular ceramic filter an isostat is used which is a casing having a removable central mandrel and a bag of flexible material which may be filled with pressurized fluid. The substrate layer is blended with the bonding system into a plastic mass and placed in the isostat around the mandrel. Pressure is then applied to isostatically compress the mass. A generally tubular substrate of coarser, higher permeability ceramic material (in the green state) is then formed.

In order to obtain a more uniform external shape, and consequently a uniform layer thickness, the mandrel and the compressed substrate material adhering thereto may be mechanically trimmed, as in a lathe with a cutting tool applied, forming a constant diameter cylindrical peripheral surface.

The mandrel and previously formed substrate layer are then returned to the original or to another isostatic press. The blended plastic mass of finer particle refractory ceramic material and binder system is then placed in the isostat and isostatically compressed. The mandrel, substrate and outer layer may then be removed from the isostat and replaced upon the lathe and cut down to provide an exterior cylindrical peripheral surface of constant diameter, and precisely constant thickness of external layer. The process may be repeated as many times as layers are desired, using different plastic masses, each with a different, finer particle size refractory ceramic material.

The mandrel may then be removed from the composite structure and the tube fired by conventional firing means (either horizontally or vertically supported in a kiln), using firing techniques known in the art and similar to those used heretofore in making ceramic tubes. The resulting ceramic layered tube is a monolith as shown in FIGS. 1 and 2 and is especially useful for filtration of gaseous and liquid streams and in diffusion applications. The layered tube is cut to desired lengths by a diamond saw or other appropriate cutting device.

Variations and modifications in the herein described ceramic filter, within the scope of the invention, will undoubtedly suggest themselves to those skilled in the art. Accordingly the foregoing description should be taken as illustrative and not in a limiting sense.

I claim:

1. A ceramic filter comprising a substrate layer of ceramic material of a first porosity and a second layer of ceramic material of a second porosity different from said first porosity formed on said substrate layer to define a monolithic structure having in cross-section a distinct line separating said layers by compressing a first plastic mass of ceramic particles of a first particle size mixed with a binder to form said substrate, applying and compressing together with said formed substrate layer a second plastic mass of ceramic particles of a second particle size mixed with a binder to form a composite body of said substrate layer and said second layer, and firing said composite body until it becomes hard.

2. The filter according to claim 1 wherein said ceramic materials of said layers are each refractory.

3. The filter according to claim 1 wherein said compressing is carried out isostatically.

4. The filter according to claim 1 wherein said first porosity is less than said second porosity and said first particle size is greater than said second particle size.

5. The filter according to claim 1 having a plurality of said layers each of a porosity different from said substrate and from each other defining a monolithic structure having in cross-section distinct lines separating said layers and formed by the compression of one or more additional plastic masses of ceramic particles of particle size different from said first and second particle sizes, together with said substrate and second layers to form said composite body prior to firing said body.

6. The filter according to claim 5 wherein the porosity of said layers decreases from said substrate layer outwardly with said substrate layer being of greatest porosity, said second layer of next greater porosity and so forth.

7. The filter according to claim 6 wherein said substrate layer is a tube and said second layer of next greater property and so forth thereon are concentric with said substrate layer and are also tubular.

8. The filter according to claim 1 wherein said layers are each tubular and said first and second masses together are compressed upon a mandrel, and removing said mandrel prior to firing.

9. The filter according to claim 8 wherein said compression upon said mandrel is carried out isostatically.

10. The filter according to claim 8 wherein said substrate layer is formed into a cylinder of certain diameter by turning the substrate layer while assembled on the mandrel with the aid of a cutting tool, and then applying said plastic mass thereto and compressing said second plastic mass upon said substrate layer and mandrel to form the said second layer as a tubular layer upon said substrate layer.

11. The filter according to claim 10 wherein the periphery of said second layer is formed into a cylindrical surface of constant diameter by turning said composite body and with the aid of a cutting tool prior to firing.

* * * * *